(12) United States Patent
Malasamudra et al.

(10) Patent No.: US 12,340,200 B2
(45) Date of Patent: Jun. 24, 2025

(54) SYSTEM AND METHOD FOR IMPLEMENTING A MONITORING TOOL SWITCH

(71) Applicant: JPMorgan Chase Bank, N.A., New York, NY (US)

(72) Inventors: Suraj Malasamudra, Singapore (SG); Ramprasad Kannan, Singapore (SG); Padmanabhan Venkitachalam, Singapore (SG); N. Deepak Prasath, Singapore (SG); David D. Knox, Magnolia, TX (US); Chirag Desai, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/333,514

(22) Filed: May 28, 2021

(65) Prior Publication Data
US 2021/0373876 A1    Dec. 2, 2021

Related U.S. Application Data

(60) Provisional application No. 63/031,733, filed on May 29, 2020.

(51) Int. Cl.
*G06F 8/65* (2018.01)
*G06F 8/71* (2018.01)
(52) U.S. Cl.
CPC ..................................... *G06F 8/65* (2013.01)
(58) Field of Classification Search
CPC ............... G06F 8/65; G06F 8/60; G06F 8/71
See application file for complete search history.

(56) References Cited

U.S. PATENT DOCUMENTS

| | | | |
|---|---|---|---|
| 10,353,699 B1* | 7/2019 | Yu | G06F 8/71 |
| 10,404,474 B1* | 9/2019 | Caceres | H04L 9/3263 |
| 10,579,966 B1* | 3/2020 | Willson | G06F 8/20 |
| 2015/0248280 A1* | 9/2015 | Pillay | G06F 8/41 |
| | | | 717/106 |
| 2016/0239295 A1* | 8/2016 | Kolesnik | G06F 8/30 |
| 2017/0329695 A1* | 11/2017 | Bhole | G06F 11/3466 |
| 2018/0373502 A1* | 12/2018 | Ganninger | G06F 8/34 |
| 2019/0129701 A1* | 5/2019 | Hawrylo | G06F 8/71 |
| 2019/0235988 A1* | 8/2019 | Janjua | G06F 21/562 |
| 2020/0019411 A1* | 1/2020 | Nadella | G06F 8/71 |

(Continued)

FOREIGN PATENT DOCUMENTS

CN    110196725 A   *   9/2019

OTHER PUBLICATIONS

NPL1: (ITRS Geneos, "FKM Plugin User Guide", Sep. 22, 2017) (Year: 2017).*

*Primary Examiner* — Noor Alkhateeb
(74) *Attorney, Agent, or Firm* — Greenblum & Bernstein, P.L.C.

(57) ABSTRACT

An embodiment of the present invention is directed to a Monitoring Tool Switch that provides control for making monitoring changes in production environments. An embodiment of the present invention is directed to providing a firm-wide software development life cycle (SDLC) strategic tool to streamline and better control monitoring configuration changes. An embodiment of the present invention may be represented as a platform that targets Production Management teams as end user.

16 Claims, 4 Drawing Sheets

(56) References Cited

U.S. PATENT DOCUMENTS

| | | | |
|---|---|---|---|
| 2020/0073678 A1* | 3/2020 | Stracener | G06F 8/60 |
| 2020/0233403 A1* | 7/2020 | Gelbke | H04L 67/10 |
| 2020/0356365 A1* | 11/2020 | Pezaris | G06F 8/73 |
| 2021/0248058 A1* | 8/2021 | Hattingh | G06F 9/45558 |
| 2021/0360085 A1* | 11/2021 | Selegean | G06F 8/656 |

* cited by examiner

SYSTEM AND METHOD FOR IMPLEMENTING A MONITORING TOOL SWITCH

CROSS REFERENCE TO RELATED APPLICATIONS

The application claims priority to U.S. Provisional Application 63/031,733, filed on May 29, 2020, the contents of which are incorporated by reference herein in their entirety.

FIELD OF THE INVENTION

The invention relates generally to a system and method for implementing a switch for a monitoring tool, such as Geneos.

BACKGROUND OF THE INVENTION

Current firm wide monitoring tools setup across various lines of business (LOBs) have limited environment management. Monitoring changes are generally performed in the production environment and therefore carry a risk of impacting working setup should there be any errors. With current solutions, custom scripts and SQLs used in monitoring tools are owned by individuals and stored on temporary storage or an individual's home directory on the servers. There is no common repository or management features.

Also, there are restrictions in maintaining audit and versioning of changes to a live setup. Monitoring tools have limited version control where changes are generally made without any audit or quality control. Moreover, once changes are made, there is no mechanism to rollback changes because current tools do not capture and audit changes. Accordingly, current tools lack mechanisms to properly track changes and updates.

These and other drawbacks exist.

SUMMARY OF THE INVENTION

According to one embodiment, the invention relates to a system that implements a monitoring tool switch interface. The system comprises: a local workspace executing on a local computer processor; a repository associated with the local workspace, the repository having a development branch associated with a User Acceptance Testing (UAT) environment and a master branch associated with a production environment; and the local computer processor, coupled to the repository and at least one UAT server file host and at least one Production server file host, programmed to perform the steps of: identifying a configuration file; enabling a user to make one or more code changes to the configuration file; pushing the one or more code changes to the repository in the development branch wherein the one or more code changes is associated with a key that provides a time date stamp for each change; generating a pull request from the development branch to the master branch; enabling a peer review for the one or more changes; and merging, via a pipeline, the one or more code changes to the master branch for automatic deployment.

According to another embodiment, the invention relates to a method that implements a monitoring tool switch interface. The method comprises the steps of: executing a local workspace on a local computer processor, wherein a repository is associated with the local workspace, the repository having a development branch associated with a User Acceptance Testing (UAT) environment and a master branch associated with a production environment and wherein the local computer processor is coupled to the repository and at least one UAT server file host and at least one Production server file host; identifying, via an interface, a configuration file; enabling, via the interface, a user to make one or more code changes to the configuration file; pushing the one or more code changes to the repository in the development branch wherein the one or more code changes is associated with a key that provides a time date stamp for each change; generating a pull request from the development branch to the master branch; enabling a peer review for the one or more changes; and merging, via a pipeline, the one or more code changes to the master branch for automatic deployment.

An embodiment of the present invention is directed to a specially programmed computer system comprising one or more computer processors, interactive interfaces, electronic storage devices, and networks. The computer implemented system and method described herein provide unique advantages to developers, production managers and other users, according to various embodiments of the invention. An embodiment of the present invention is directed to implementing software development life cycle (SDLC) controls to monitor changes for streamlined auditing and tracking. An embodiment of the present invention provides a single repository for artifacts with functional account ownership. With a distributed version control system, users have access to a local repository, complete with a full history of commits. An embodiment of the present invention realizes efficiency and controls for applications in various production environments. Other benefits and features may include: creating rollback capability; providing artifacts that are fully owned and maintained by Production Management; introduction of a change reviews process; supporting JIRA requests to track ownership of changes; and customizing the setup for different applications.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the present invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

An embodiment of the present invention is directed to a Monitoring Tool Switch that provides controls for making monitoring changes in production environments. An embodiment of the present invention is directed to providing a firm-wide software development life cycle (SDLC) strategic tool to streamline and control monitoring configuration changes. An embodiment of the present invention may be represented as a platform that targets Production Management teams as end user. According to an exemplary illustration, the innovative platform provides integration with various services, including JIRA, Jenkins/Jules, Bitbucket and AIM. JIRA provides issue tracking and project management services for various use cases including requirements and test case management as well as agile software development. Jenkins and Jules represent automation servers that automate software development relating to building, testing and deploying as well as facilitating continuous integration and continuous delivery. Bitbucket represents a version control repository hosting service for source code and development projects. AIM represents a deployment tool. Specific services are identified for illustration purposes only. The various embodiments of the present invention may be applied to and integrated with other services, servers, platforms, tools and products.

Any changes to monitoring may follow standard release protocols similar to other business applications. Artifacts owned by production management may have a single repository and may be hosted on common drives on various host systems.

An embodiment of the present invention is directed to a switch or interface for system management and monitoring tools, such as Geneos. Such management and monitoring tools may be widely deployed within an entity, such as a financial institutions in the Financial Services industry. The monitoring and system management needs may be specific to critical real-time applications. While the various illustrations and examples relate to Geneos, the present invention is not limited and may be applied and integrated with various other management and monitoring products, services and tools.

According to an exemplary application, an embodiment of the present invention is directed to achieving automated versioning and release of Geneos monitoring setup. Individuals in production management may be expected to promote changes to Geneos configuration following a defined protocol using Bitbucket and Jenkins/Jules, for example. Furthermore, an embodiment of the present invention may be directed to enhancing other applications in production management and beyond.

An embodiment of the present invention is directed to providing management services (e.g., JIRA) integration, continuous integration, controls, change log, versioning and artifact repository, etc.

Figure 1:
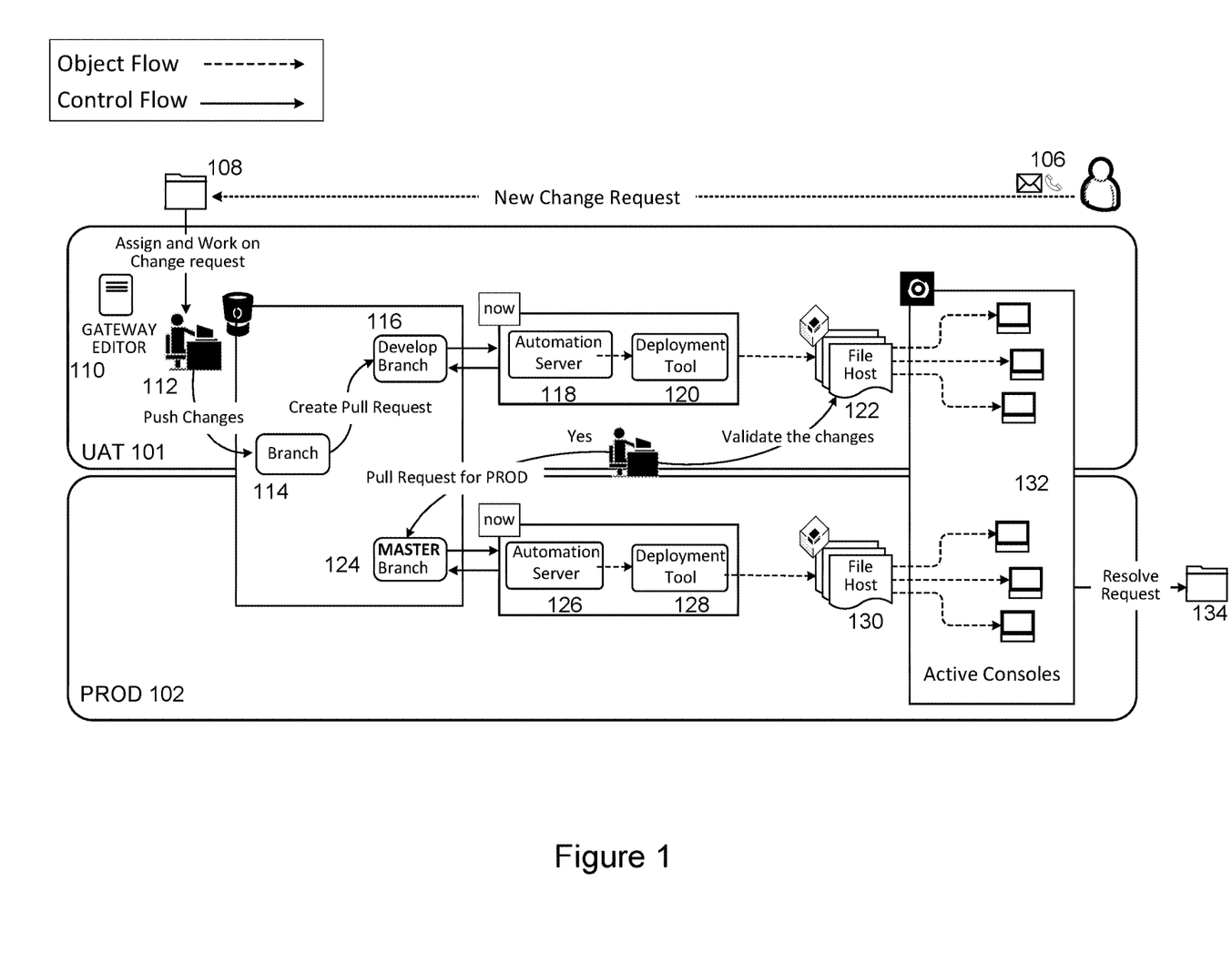
FIG. 1 is an exemplary system diagram, according to an embodiment of the present invention.

FIG. 1 is an exemplary system diagram, according to an embodiment of the present invention. The system of FIG. 1 provides version management, change logging, change controls, peer review/User Acceptance Testing (UAT), single artifact repository, distributed development and management services (e.g., JIRA) integration. As shown in FIG. 1, a user 106 may submit a new change request. The new request may be a file 108, e.g., XML file or other file format. The file may be assigned at 112, via Gateway Editor 110. At UAT 101, 112 may then push changes to branch 114. Branch 114 may represent a JIRA branch, for example. Branch 114 may create a pull request that may be sent to Develop Branch 116. Develop Branch 116 may communicate with Automation Server 118 (e.g., Jenkins, Jules, etc.) and Deployment Tool 120 (e.g., AIM). The request may be received at File Host 122, which may then be made available to various users via user interfaces or Active Consoles represented by 132. Changes may be validated and received at File Host 122. Pull request for production may be received by Master Branch 124 at Production 102. Master Branch may communicate with Automation Server 126 (e.g., Jenkins, Jules, etc.) and Deployment Tool 128 (e.g., AIM, etc.). The request may be received at File Host 130, which may then be made available to various users via user interfaces or Active Consoles represented by 132. A resolve request may be generated at 134. According to an exemplary illustration, a resolve request may be currently tracked in JIRA and once the changes are tested and deployed, JIRA may be marked as resolved.

An embodiment of the present invention provides SDLC controls in monitoring changes to streamline auditing. Details regarding changes may be captured and then provided through a user interface or other communication. This may include change details, who made the changes, when the change was made, etc. An embodiment of the present invention provides a single repository for artifacts with functional account ownership. With a distributed version control system, instead of a working copy, each person who makes changes may have their own local repository, which may include a full history of commits and other actions. An embodiment of the present invention realizes efficiency and controls for applications without access to non-production/re-production environments. Other features may include: creating rollback capability; providing artifacts that are fully owned and maintained by Production Management; introducing a change review process; supporting management services (e.g., JIRA) requests to track ownership of changes; and customizing the setup for different applications.

An embodiment of the present invention is directed to implementing a Geneos switch or interface across various applications in a securities suite of applications. This innovative framework may be extended to other applications in production management and other areas. Integration with various services may be realized, including integration with ICA (Instant Change Authorization) Service Now, for example.

Figure 2:
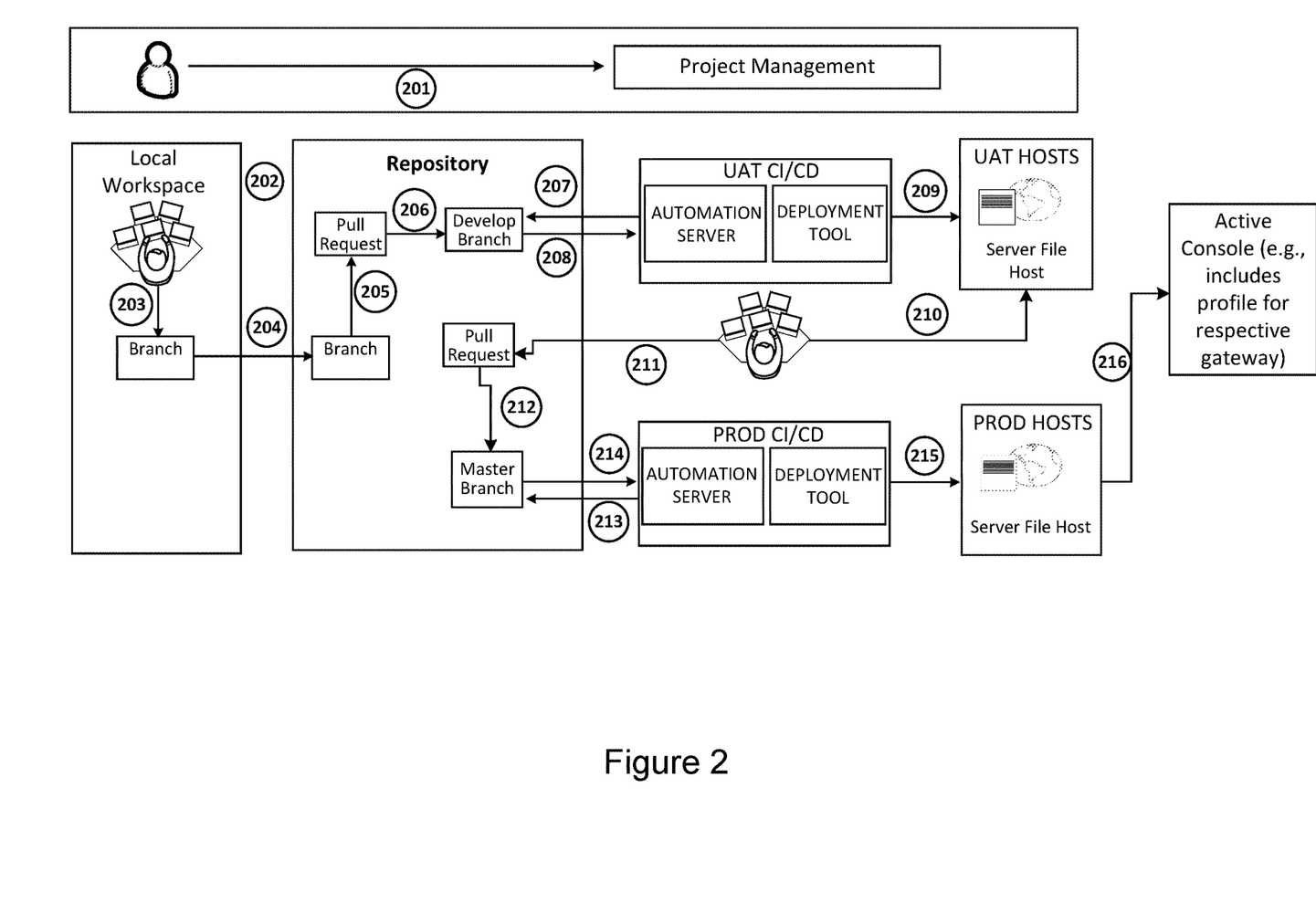
FIG. 2 is an exemplary system diagram, according to an embodiment of the present invention.

FIG. 2 is an exemplary system diagram, according to an embodiment of the present invention. At step 201, for every change to be made in scripts (e.g., Geneos scripts), a corresponding job (e.g., JIRA job) may be created. For example, a user may pick up the job and assign it to itself or to another entity. At step 202, a user may clone (e.g., syncs up with) the repository, such as a repository in BitBucket. At step 203, a user may create a new branch in the repository with a corresponding identifier as the branch name. At step 204, a user may publish the work in a Branch, e.g., JIRA branch. At step 205, after proper testing, a user may push a pull request to a Develop Branch. At step 206, the corresponding changes may be implemented in a Develop Branch prior to testing. At step 207, an Automation Server in UAT may detect the changes in the Develop Branch. At step 208, the Automation Server may trigger a job based on the latest changes to deploy the changes in UAT hosts using Deployment Tool artifacts. At step 209, Automation Server pushes to the Deployment Tool which then deploys the files in a Server File Host.

At step 210, an Interface or Active Console may pick up the latest changes from UAT host. The user may now validate these changes. At step 211, after a successful validation, the user may create a pull request from Develop Branch to Master Branch. At step 212, the pull request may be created and sent to a respective manager for approval before merging into master. At step 213, Automation Server in PROD may detect the changes in Master Branch. At step 214, Automation Server may trigger a job based on the latest changes to deploy the changes in PROD hosts using Deployment Tool artifacts.

At step 215, Automation Server pushes to Deployment Tool which then deploys the files in a Server File Host. At step 216, an interface or Active Console picks up the latest changes in PROD host.

Leveraging an embodiment of the present invention to make configuration changes will be compliant with auditing, versioning, source control, build and release control with change rollback capability. According to an exemplary embodiment, the Geneos switch or interface may build on an implementation of Git, Bitbucket, AIM (deployment tool) and ITRS Geneos.

With an embodiment of the present invention, users may make changes, create branches, commit the branches, push the changes and create pull requests for review and other purposes. For example, after the pull requests are approved and merged with a Develop branch (UAT) and a Master branch (Production), a user may see their changes in the respective user interfaces, e.g., Geneos active consoles, once the deployment is done (through Jenkins or Jules).

Figure 3:
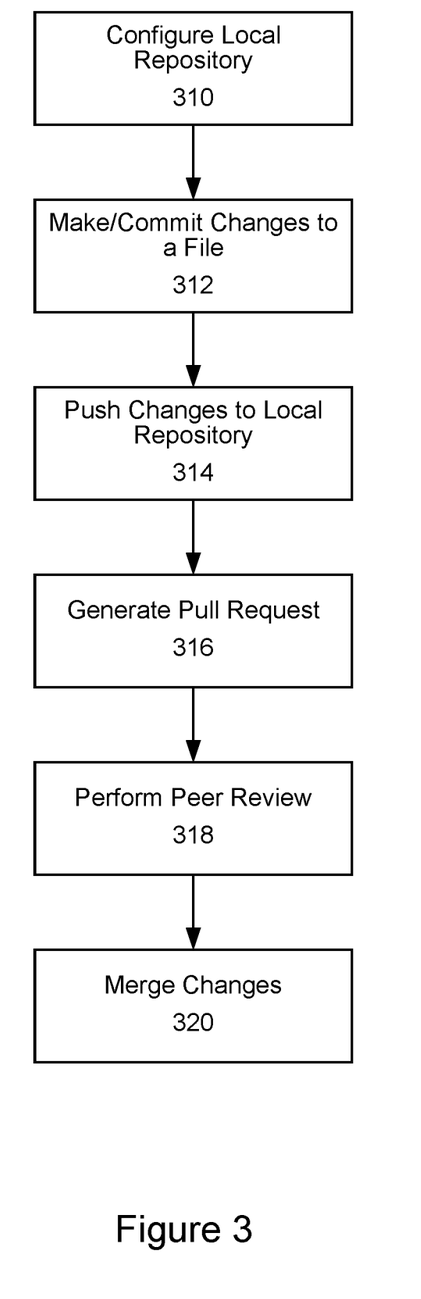
FIG. 3 is an exemplary flowchart, according to an embodiment of the present invention.

FIG. 3 is an exemplary flowchart, according to an embodiment of the present invention. At step 310, a local repository may be configured. At step 312, changes may be committed. At step 314, changes may be pushed to the local repository. At step 316, pull requests may be created/generated. At step 318, a peer review may be performed. At step 320, changes may be merged. While the process of FIG. 3 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

An embodiment of the present invention seeks to manage accurate and timely change and monitoring information. Accordingly, a change may be captured and managed within a production management environment. This may be used to monitor the health of an application and perform other checks and validations. An embodiment of the present invention seeks to treat monitoring configuration as code. An embodiment of the present invention provides a level of control and an additional review prior to production. Accordingly, an embodiment of the present invention provides control and auditing capabilities on various production monitoring changes. In addition, multiple users may make changes to the same configuration at the same time.

At step 310, a local repository may be configured. For example, this may involve cloning a repository to a local computer. Within a local repository, a branch may be created. The branch may be a custom branch from a master branch. For example, changes may be pushed to the branch. In this example, a user may work on a branch instead of the master branch. Accordingly, after proper review and testing, the changes may be merged with a master branch.

At step 312, changes may be made. For example, through a Gateway Setup Editor, a user may browse for a file to modify. For example, a user may browse for a XML file to modify in the Gateway Setup Editor. Changes may be made to configuration data, files, etc.

At step 314, changes may be pushed to the local repository. After the file is edited, the changes may be saved and renamed if appropriate. The updated file may then be committed to a branch. The changes may be committed with a comment along with a key. The key may provide a time date stamp for the change. For example, multiple files may be committed. A corresponding commit entry may be created in the local repository. For example, a user may select the branch and then validate the commit. A commit message may include "committing a minor change in the file . . . ."

At step 316, pull requests may be created. For example, a detailed page may include changes to be merged with a develop branch (UAT). For the pull request, a source and destination may be selected. A corresponding description may be created that indicates why the pull request was created and what changes were intended. In addition, individuals may be selected for peer review and other reviews.

At step 318, a peer review may be performed. For example, a reviewer may check a "diff section" and view the changes that are part of the pull request. The reviewer may approve or decline the pull request. In addition, the reviewer may propose a modification through a comment that may be added where the change needs to be modified. For example, a user may add a comment in a specific line of code.

At step 320, changes may be merged. Once the pull request gets reviewed and approved, an embodiment of the present invention may merge the changes into a Develop Branch. Once the change is merged to Develop Branch (UAT), a corresponding job may get triggered after detecting the changes in Master Branch and then the changes may be deployed using AIM. In addition, the changes may be separately verified. When the changes are approved in Develop (UAT), a pull request may be created to merge changes into Master (Production).

An embodiment of the present invention may be available as an application program interface (API). For example, a gateway may be onboarded on a Geneos Switch Framework and go through an authentication model and authorization model.

Figure 4:
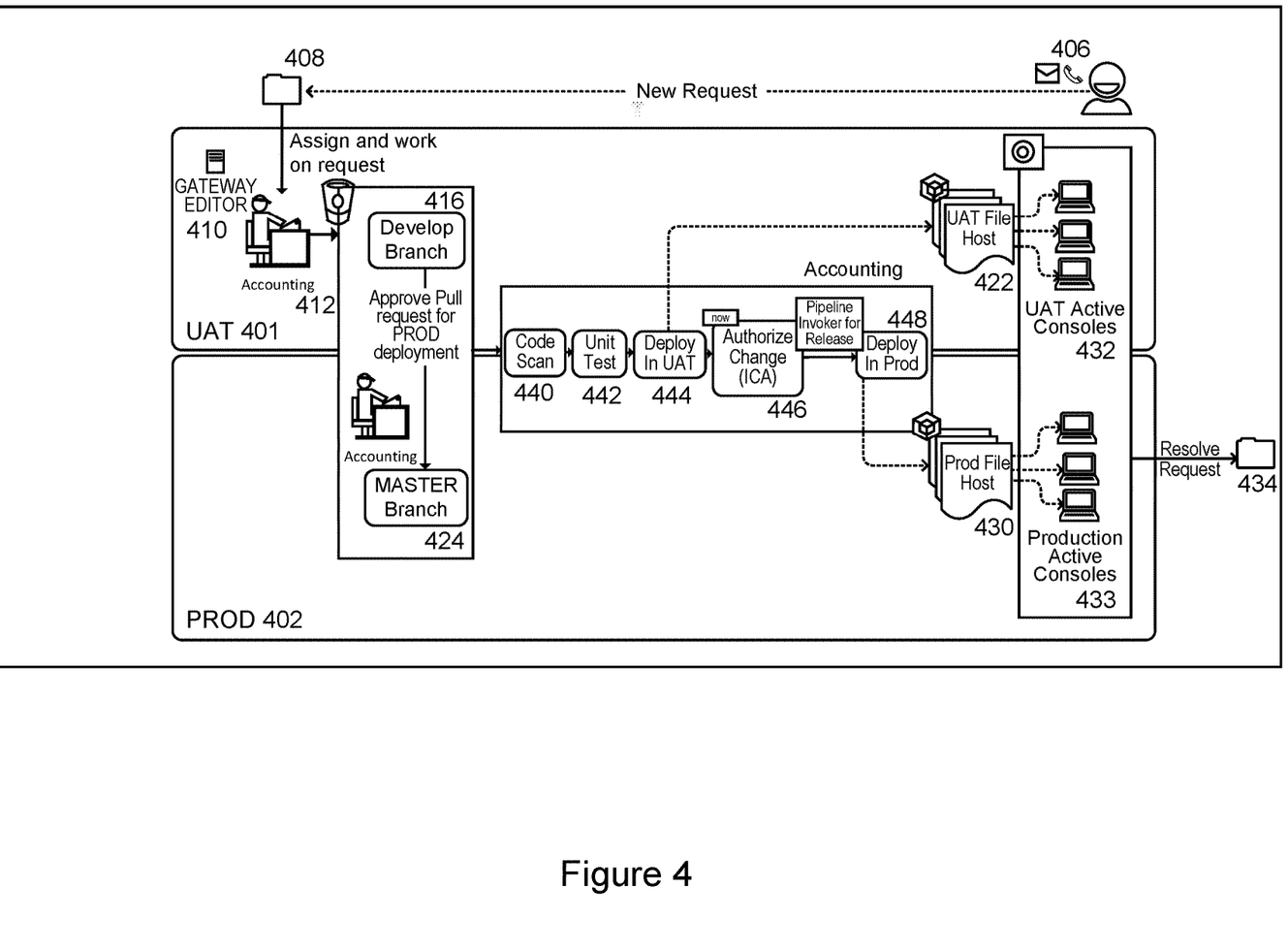
FIG. 4 is an exemplary system diagram, according to an embodiment of the present invention.

FIG. 4 is an exemplary system diagram, according to an embodiment of the present invention. Instead of two pipelines shown in FIG. 1, an embodiment of the present invention may implement a single pipeline for UAT and Production change requests. As illustrated in FIG. 4, one build job listens to the master branch and initiates the build.

The system of FIG. 4 provides version management, change logging, change controls, peer review/User Acceptance Testing (UAT), single artifact repository, distributed development and management services (e.g., JIRA) integration. As shown in FIG. 4, a user 406 may submit a new change request. The request may be a JIRA request. The new request may be a file 408, e.g., XML file or other file format. The file may be assigned at 412, via Gateway Editor 410. At UAT 401, 412 may then interact with Develop Branch 416 to approve pull requests for production deployment via master branch 424. For example, user 406 may commit code into a develop branch 416. Within develop branch 416, another user may create or initiate creation of a pull request. When the pull request is uploaded, it may then be merged with master branch 424. A build may then be initiated.

Several modules may be implementing including Code Scan 440, Unit Test 442, Deploy in UAT 444, Authorize Change (ICA—Instant Change Authorization) 446 and Deploy in Production 448. Code Scan 440 may scan the code for vulnerabilities. Unit Test 442 may initiate tests, checks and/or other processes. With Deploy in UAT 444, the requested changes may be applied in UAT File Host 422. As shown in FIG. 4, Deploy in UAT 444 may communicate with UAT File Host 422, which may then be made available to various users via user interfaces or UAT Active Consoles represented by 432. Changes may be validated and received at UAT File Host 422.

Between Authorize Change (ICA) 446 and Deploy in Production 448, a pipeline invoker for release may be enabled. For example, the pipeline invoker may be responsible for verifying functional and smoke tests around the changes completed in UAT Gateway. Such tests may be designed to reveal certain failures or issues and may be executed on an application build to verify functionality. In addition, the pipeline invoker may represent an authorizer. The authorizer may access a console or other interface, view the requested changes and then approve or deny accordingly. With Authorize Change (ICA) 446, deployment into production by a host may be initiated and other users may connect through a gateway to view and access the reflected changes.

Deploy in Production 448 may communicate with Production File Host 430, which may then be made available to various users via user interfaces or Production Active Consoles represented by 433. Changes may be validated and received at Production File Host 430. A resolve request may be generated at 434.

UAT File Host 422 and Production File Host 430 may represent physical hardware and may also be realized as virtual devices in a cloud environment. Other implementations may be realized in accordance with the various embodiments of the present invention.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner.

Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a monitoring tool switch interface, the system comprising:
    a local workspace executing on a local computer processor;
    a repository associated with the local workspace, the repository having a development branch associated with a User Acceptance Testing (UAT) environment and a master branch associated with a production environment;
    an interface that comprises a gateway setup editor (GSE) that is capable of browsing for a configuration file that utilizes an XML file format; and
    the local computer processor coupled to the repository and at least one UAT server file host and at least one production server file host, wherein the local computer processor is programmed to:
    identify the configuration file;
    enable, via the GSE, more than one user to simultaneously make more than one code change to the configuration file;
    receive the more than one code change from the more than one user, collectively;
    push the more than one code change to the repository in the development branch, wherein an audit is generated for the more than one code change;
    provide a time date stamp for a code change file that comprises the more than one code change;
    in response to the push of the more than one code change to the repository in the development branch, deploy the more than one code change to the configuration file to the at least one UAT server file host, wherein the at least one UAT server file host and the at least one production server file host comprise virtual hosts within a cloud environment;
    implement a pipeline invoker that verifies at least one test around the more than one code change, wherein verifying the at least one test around the more than one code change comprises respectively responding to each corresponding code change from among the more than one code change by one from among: approving the corresponding code change and denying the corresponding code change, respectively;
    validate, based on the verifying, the more than one code change to the configuration file;
    upon successful validation of the more than one code change to the configuration file, generate a pull request from the development branch to the master branch;
    enable a peer review for the more than one code change;
    merge, via a pipeline, the more than one code change to the master branch for automatic deployment, wherein the pipeline represents multiple parallel pipelines;
    initiate a new build by releasing the more than one code change with roll back capability;
    deploy, to the at least one production server file host, the more than one code change to the configuration file, wherein the at least one production server file host is coupled to one or more production active consoles;
    roll back at least one code change from among the more than one code change to a prior build;
    commit each code change from among the more than one code change, except the at least one code change, to the configuration file within a local branch, wherein a plurality of files may be committed including the configuration file; and
    create a respectively corresponding commit entry for each of the plurality of files committed within the local branch, wherein the respectively corresponding commit entry comprises a message that indicates that a minor change is being committed to at least one configuration file from among the plurality of files.

2. The system of claim 1, wherein the pipeline comprises a code scan module that scans the more than one code change for vulnerabilities.

3. The system of claim 1, wherein the pipeline comprises a deploy in UAT module that is coupled to the at least one UAT server file host.

4. The system of claim 1, wherein the pipeline comprises a deploy in production module that is coupled to the at least one production server file host.

5. The system of claim 1, wherein the at least one UAT server file host is coupled to one or more UAT active consoles.

6. The system of claim 1, wherein the local computer processor is further programmed to: after performing the automatic deployment, display the more than one code change on an interface.

7. The system of claim 1, wherein the monitoring tool switch interface is built on top of an implementation of at least one from among: an issue tracking and project management service; servers that automate software build development; a version control repository hosting service for source code and development projects; and a deployment tool.

8. The system of claim 1, wherein the at least one test comprise a smoke test.

9. A method that implements a monitoring tool switch interface, the method comprising:
    executing a local workspace on a local computer processor, wherein a repository is associated with the local workspace, the repository having a development branch associated with a User Acceptance Testing (UAT) environment and a master branch associated with a production environment and wherein the local computer processor is coupled to the repository and at least one UAT server file host and at least one production server file host;

identifying, via an interface that comprises a gateway setup editor (GSE) that is capable of browsing for a configuration file that utilizes an XML file format, the configuration file;

enabling, via the GSE, more than one user to simultaneously make more than one code change to the configuration file;

receiving the more than one code change from the more than one user, collectively;

pushing the more than one code change to the repository in the development branch, wherein an audit is generated for the more than one code change;

providing a time date stamp for a code change file that comprises the more than one code change;

in response to the pushing the more than one code change to the repository in the development branch, deploying the more than one code change to the configuration file to the at least one UAT server file host, wherein the at least one UAT server file host and the at least one production server file host comprise virtual hosts within a cloud environment;

implementing a pipeline invoker that verifies at least one test around the more than one code change, wherein verifying the at least one test around the more than one code change comprises respectively responding to each corresponding code change from among the more than one code change by one from among: approving the corresponding code change and denying the corresponding code change, respectively;

validating, based on the verifying, the more than one code change to the configuration file;

upon successful validation of the more than one code change to the configuration file, generating a pull request from the development branch to the master branch;

enabling a peer review for the more than one code change;

merging, via a pipeline, the more than one code change to the master branch for automatic deployment, wherein the pipeline represents multiple parallel pipelines;

initiating a new build by releasing the more than one code change with roll back capability;

deploying, to the at least one production server file host, the more than one code change to the configuration file, wherein the at least one production server file host is coupled to one or more production active consoles;

rolling back at least one code change from among the more than one code change to a prior build;

commit each code change from among the more than one code change, except the at least one code change, to the configuration file within a local branch, wherein a plurality of files may be committed including the configuration file; and create a respectively corresponding commit entry for each of the plurality of files committed within the local branch, wherein the respectively corresponding commit entry comprises a message that indicates that a minor change is being committed to at least one configuration file from among the plurality of files.

10. The method of claim 9, wherein the pipeline comprises a code scan module that scans the more than one code change for vulnerabilities.

11. The method of claim 9, wherein the pipeline comprises a deploy in UAT module that is coupled to the at least one UAT server file host.

12. The method of claim 9, wherein the pipeline comprises a deploy in production module that is coupled to the at least one production server file host.

13. The method of claim 9, wherein the at least one UAT server file host is coupled to one or more UAT active consoles.

14. The method of claim 9, further comprising: after performing the automatic deployment, displaying the more than one code change on an interface.

15. The method of claim 9, wherein the monitoring tool switch interface is built on top of an implementation of at least one from among: an issue tracking and project management service; servers that automate software build development; a version control repository hosting service for source code and development projects; and a deployment tool.

16. The method of claim 9, wherein the at least one test comprise a smoke test.

* * * * *